United States Patent
Zhang et al.

(10) Patent No.: US 8,431,276 B2
(45) Date of Patent: Apr. 30, 2013

(54) USING AN EFFECTIVENESS APPROACH TO MODEL A FUEL CELL MEMBRANE HUMIDIFICATION DEVICE

(75) Inventors: Yan Zhang, Victor, NY (US); John C. Fagley, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 439 days.

(21) Appl. No.: 12/755,315

(22) Filed: Apr. 6, 2010

(65) Prior Publication Data

US 2011/0239747 A1 Oct. 6, 2011

(51) Int. Cl.
*H01M 8/04* (2006.01)
*G01N 7/00* (2006.01)
*H01M 8/10* (2006.01)

(52) U.S. Cl.
USPC .......................... 429/413; 429/450; 73/29.01

(58) Field of Classification Search .................. 429/413, 429/450; 73/29.01
See application file for complete search history.

(56) References Cited

U.S. PATENT DOCUMENTS

| | | | |
|---|---|---|---|
| 2006/0263652 A1* | 11/2006 | Logan | 429/13 |
| 2006/0263653 A1* | 11/2006 | Sinha et al. | 429/13 |
| 2007/0141412 A1* | 6/2007 | Becker et al. | 429/22 |
| 2009/0191432 A1 | 7/2009 | Logan | |

\* cited by examiner

*Primary Examiner* — Gregg Cantelmo
(74) *Attorney, Agent, or Firm* — John A. Miller; Miller IP Group, PLC

(57) ABSTRACT

A method for determining the water transfer in a water vapor transfer unit of a fuel cell system that employs a model based approach. The method includes determining a capacity ratio of wet streams and dry streams flowing through the water vapor transfer unit, determining the number of mass transfer units of the water vapor transfer unit, estimating a mass transfer effectiveness value given the capacity ratio and the number of mass transfer units for the water vapor transfer unit, and determining the amount of water transferred in the water vapor transfer unit using the mass transfer effectiveness value, the mass flow rates on a dry basis of the dry stream and the wet stream, and the mass flow rates of water of the dry inlet stream and the wet inlet stream.

16 Claims, 1 Drawing Sheet

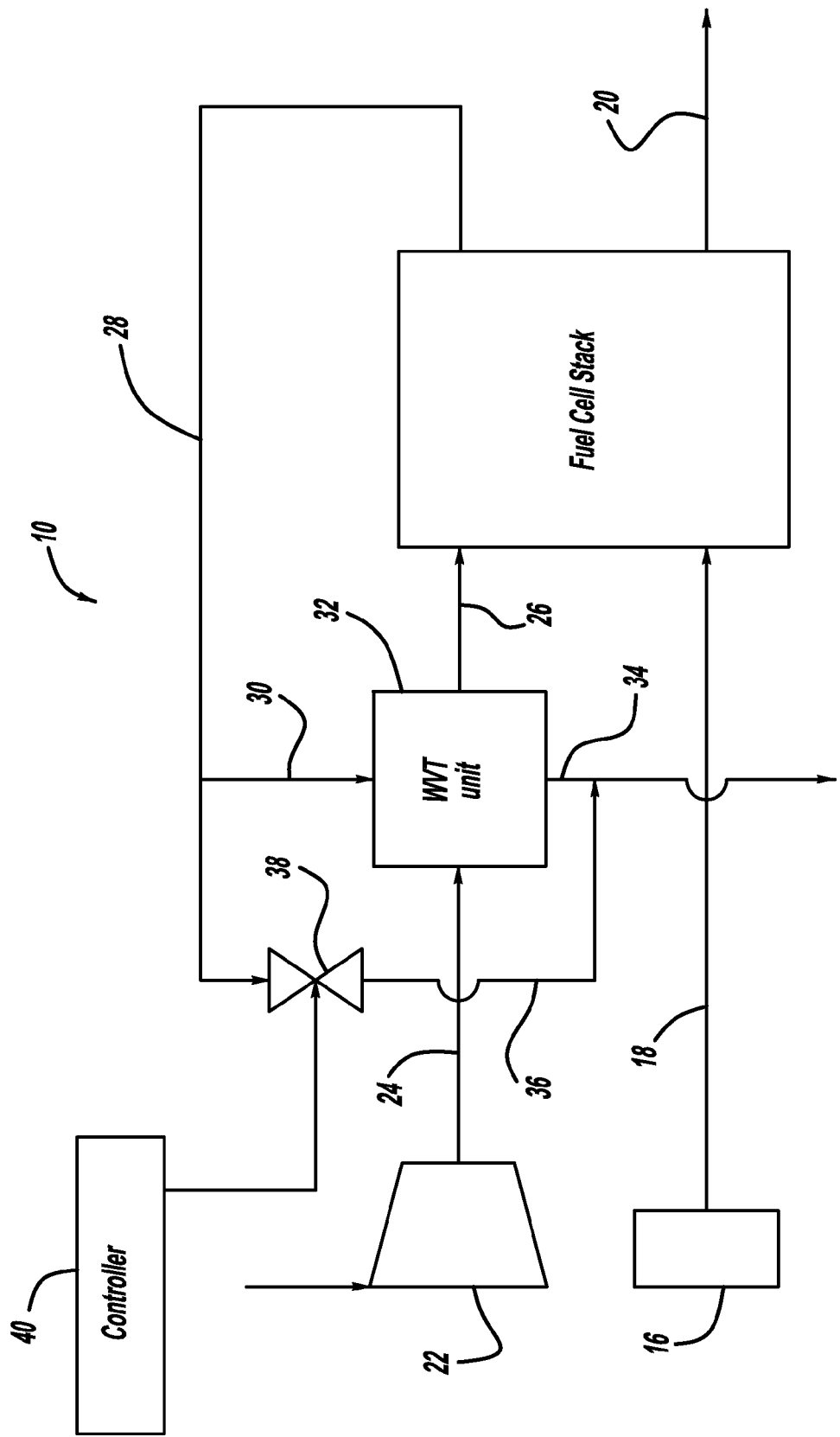

USING AN EFFECTIVENESS APPROACH TO MODEL A FUEL CELL MEMBRANE HUMIDIFICATION DEVICE

BACKGROUND OF THE INVENTION

1. Field of the Invention

This invention relates generally to a method for employing an effectiveness approach to model the performance of a fuel cell stack humidification device and, more particularly, to a method for employing an effectiveness approach to model the performance of a fuel cell stack humidification device so as to determine the amount of water transferred by the humidification device to provide humidification device control and/or design.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode side catalyst to generate free protons and electrons. The protons pass through the electrolyte to the cathode. The protons react with the oxygen and the electrons in the cathode side catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode electrodes (catalyst layers) typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). Each MEA is usually sandwiched between two sheets of porous material, the gas diffusion layer (GDL), that protects the mechanical integrity of the membrane and also helps in uniform reactant and humidity distribution. MEAs are relatively expensive to manufacture and require certain humidification conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as reaction by-product. The fuel cell stack also receives an anode hydrogen reactant gas that flows into the anode side of the stack. The stack also includes flow channels through which a cooling fluid flows.

A fuel cell stack includes a series of bipolar plates (separators) positioned between the several MEAs in the stack, where the bipolar plates and the MEAs are positioned between the two end plates. The bipolar plates include anode side and cathode side flow distributors (flow fields) for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membranes within a fuel cell need to have certain water content so that the ionic resistance across the membrane is low enough to effectively conduct protons. This humidification may come from the stack water by-product or external humidification. The flow of reactants through the gas flow channels has a drying effect on the membranes, most noticeably at an inlet of the flow. However, the accumulation of water droplets within the gas flow channels could prevent reactants from flowing therethrough, and cause the cell to fail because of low reactant gas flow, thus affecting stack stability. The accumulation of water in the reactant gas flow channels, as well as within the gas diffusion media, is particularly troublesome at low stack output loads.

As mentioned above, water is generated as a by-product of the stack operation. Therefore, the cathode exhaust gas from the stack will include water vapor and perhaps liquid water. It is known in the art to use a water vapor transfer (WVT) unit to capture some of the water in the cathode exhaust gas, and use the water to humidify the cathode input airflow. Water in the cathode exhaust gas at one side of the membrane is absorbed by the membrane and transferred to the cathode air stream at the other side of the membrane.

During fuel cell system operation, it is desirable to provide the cell membranes with a certain amount of water content so they are not too wet or too dry. A stack with membranes that are too wet at low current density could have instability issues. A membrane that is too wet may cause problems during low temperature environments where freezing of the water in the fuel cell stack could produce ice that blocks flow channels and affects the restart of the system. Membranes that are too dry may have too low of a protonic conductivity, resulting in lower stack voltage and performance. In addition, membranes that are too dry at the next system restart can affect restart performance and may reduce stack durability. Therefore, there is a need in the art to provide a method for maintaining the fuel cell membrane at a level of humidification which is neither too wet nor too dry. Further, it would be useful to develop a method that estimates the humidification level of the fuel cell membrane without using an expensive relative humidity (RH) sensor and that provides a convenient and ready visualization of the physical significance of the membrane humidifier performance, i.e., the performance of a WVT unit or similar device.

SUMMARY OF THE INVENTION

In accordance with the teachings of the present invention, a method for determining the water transfer in a water vapor transfer unit of a fuel cell system is disclosed that employs a model based approach. The method includes determining a capacity ratio of wet streams and dry streams flowing through the water vapor transfer unit, determining the number of mass transfer units of the water vapor transfer unit, estimating a mass transfer effectiveness value given the capacity ratio and the number of mass transfer units for the water vapor transfer unit, and determining the amount of water transferred in the water vapor transfer unit using the mass transfer effectiveness value, the mass flow rates on a dry basis of the dry stream and the wet stream, and the mass flow rates of water of the inlet dry stream and the inlet wet stream.

Additional features of the present invention will become apparent from the following description and appended claims, taken in conjunction with the accompanying drawings.

BRIEF DESCRIPTION OF THE DRAWING

FIG. 1 is a schematic block diagram of a fuel cell system.

DETAILED DESCRIPTION OF THE EMBODIMENTS

The following discussion of the embodiments of the invention directed to a method for determining the transfer of water by a water vapor transfer (WVT) unit using an effectiveness model is merely exemplary in nature, and is in no way intended to limit the invention or its applications or uses. For example, the present invention has particular application for determining the water transfer in a WVT unit in a fuel cell system. However, as will be appreciated by those skilled in the art, the present invention may have application for other WVT units for other systems.

FIG. 1 is a schematic block diagram of a fuel cell system 10 including a fuel cell stack 12. The fuel cell stack 12 receives an anode gas from a hydrogen gas source 16 on an anode input line 18 and provides an anode exhaust gas on line 20. A compressor 22 provides compressed air to the cathode side of the fuel cell stack 12. The dry air from the compressor 22 is first sent to a water vapor transfer (WVT) unit 32 as a dry input stream on line 24 and is output from the WVT unit 32 as a humidified dry output stream on line 26. A cathode exhaust gas is output from the cathode side of the fuel cell stack 12 on cathode output line 28, which has significant water content as a result of the operation of the fuel cell stack 12. This water content is used by the WVT unit 32 to humidify the cathode air provided on the dry input stream line 24, where line 30 provides a wet input stream to the WVT unit 32 and line 34 provides a wet output stream from the WVT unit 32. A controlled amount of the cathode exhaust gas on the line 28 is sent through the WVT unit 32 by providing a by-pass line 36 around the WVT unit 32 and a by-pass valve 38 positioned in the by-pass line 36 that is selectively opened and closed to control the amount of the cathode exhaust gas that flows through the WVT unit 32, and thus how much the cathode inlet air is humidified. A controller 40 controls the position of the by-pass valve 38, as will be discussed in detail below.

The present invention proposes a model based approach used by the controller 40 to control the position of the by-pass valve 38 to control the amount of water provided to the cathode input air on the line 24, i.e. transferred by the WVT unit 32, and thus control the desired amount of fuel cell membrane humidity. This model is referred to herein as an effectiveness based water vapor transfer model. The water vapor transfer model can be used to control the position of the by-pass valve 38 and also can be used in the design of the WVT unit 32 to provide the desired amount of water transfer.

Effectiveness as used herein is a quantity that is the ratio of the actual mass transfer rate of humidity to the maximum possible mass transfer rate of humidity as would be realized in a counter-flow mass exchanger having an infinite membrane area. Effectiveness depends on the number of mass transfer units, which is a non-dimensional ratio of the product of the mass transfer coefficient and membrane area to the minimum mass flow rate on a dry basis of the dry stream and the wet stream flowing through the dry side and the wet side of the water vapor transfer unit 32, respectively. A third non-dimensional parameter employed in the model is a capacity ratio, which is the ratio of the minimum mass flow rate on a dry basis of the wet side flows on the lines 30 and 34 and the dry flows on the lines 24 and 26 of the WVT unit 32 to the maximum mass flow rate on a dry basis of the wet side flows on the lines 30 and 34 and the dry flows on the lines 24 and 26 of the WVT unit 32.

For certain operating conditions for a given design of a WVT unit 32, the amount of water transferred can be estimated using the relationships between the number of mass transfer units, the effectiveness, and the mass flow rates of streams established for heat exchanger designs. The well-established relationships between the heat transfer effectiveness and the number of heat transfer units for heat exchanger designs is available for use based on the analogy between heat transfer and mass transfer, as would be readily apparent to those skilled in the art.

To model the water vapor transfer performance of the WVT unit 32, the capacity ratio C* is calculated from the WVT unit 32 wet streams on the lines 30 and 34 and the dry streams on lines 24 and 26 using the equation:

$$C^* = \frac{\text{Min}(M_{air,dry}, M_{wet,air})}{\text{Max}(M_{air,dry}, M_{wet,air})} \quad (1)$$

Where $M_{air,dry}$ is the mass flow rate of the dry side flow on a dry basis of the WVT unit 32 in gm/sec and $M_{wet,air}$ is the mass flow rate of the wet side flow on a dry basis of the WVT unit 32 in gm/sec.

The number of mass transfer units NTU of the WVT unit 32 is defined as:

$$NTU = \frac{hA}{\min(M_{air,dry}, M_{air,wet})} \quad (2)$$

Where h is a mass transfer coefficient in (gm water/(m²-sec))/(gm air/sec) and A is the corresponding surface area in meters squared for the mass transfer.

The mass transfer coefficient h consists of the following three types of transport: (1) convection mass transport of water vapor in the flow channels, (2) diffusion transport through supporting material, such as diffusion media, and (3) water vapor transport through the membrane by diffusion. In the WVT unit 32 design, the diffusion resistances of the first and second types are minimized so that the transport through the membrane is predominately water vapor transport through the membrane by diffusion. For water transfer membranes, such as perfluorosulfonic acid type membranes, the diffusivity of water vapor through the membrane is influenced by the gas stream relative humidity and temperature.

It should be noted that if the real driving force for water transfer through the membrane is water partial pressure or relative humidity, then the model will tend to slightly under predict the performance at high power where Pwet/Pdry is larger than at lower current density due to higher pressure drop through the fuel cell stack 12 at higher throughput. In modeling the real data, such an effect can be taken into account by correlating the product value hA as a function of the wet side flow through the WVT unit 32.

For a given humidifier design, the product value hA can be estimated from the membrane area and the mass transfer resistances as described above, or it can be regressed using the water vapor transfer device component test data. For example, the value hA can be estimated using the equation:

$$hA = (a_1 \times M_{air,wet}/A + a_2 \times M_{air,dry}/A + b \times RH_{wetin} + c) \times \exp\left(-\frac{Ea}{RT_{ave,n}}\right) \quad (3)$$

Where $RH_{wetin}$ is the relative humidity of the wet inlet stream, $T_{ave,n}$ is the average temperature of the wet inlet stream on the line 30 and the dry inlet stream on the line 34 in (K), Ea is the activation energy (J/gmole), A is the membrane area in meters squared, R is the gas constant (8.314 J/gmole-K) and a, b and c are correlation coefficients. The correlation coefficients a, b, c and Ea can be estimated by regressing the component test data. Example values for these coefficients for a given humidifier design are provided in Table 1 below.

TABLE 1

| | |
|---|---|
| a1 | −1.0967 |
| a2 | 1.3815 |
| b | 21.56 |
| Ea | 1997.5 |
| c | 5.31 |

To scale up to a different membrane area, the following scale-up rule is applied as:

$$hA = (a_1 \times M_{air,wet}/A + a_2 \times M_{air,dry}/A + b \times RH_{wetin} + c) \times \exp\left(-\frac{Ea}{RT_{ave,n}}\right) \times \frac{A}{A_{base}} \quad (4)$$

Where $A_{base}$ is the membrane area of the humidifier design from which the correlation parameters were obtained.

As discussed above, it is expected that the value hA is influenced by the gas stream relative humidity (RH) and temperature. The fact that the value hA is also a function of the flow rate of the dry stream and wet stream on a dry basis indicates that there might be flow channeling effects at low power levels. Thus, not all of the cell membrane area can be utilized.

Given the capacity ratio C* and the number of mass transfer units NTU for a cross-flow WVT unit design with the dry side flow and the wet side flow unmixed, a mass transfer effectiveness value ε for the WVT unit 32, as described in the heat effectiveness literature, can be estimated by:

$$\varepsilon = 1 - \exp\left[\left(\frac{1}{c^*}\right) \times (NTU)^{0.22} \times \{\exp[-C^* \times (NTU)^{0.78}] - 1\}\right] \quad (5)$$

The effectiveness value ε is defined as:

$$\varepsilon = \frac{M_{air,dry} \times (Y_{dryout} - Y_{dryin})}{\min(M_{air,dry}, M_{air,wet}) \times (Y_{wetin} - Y_{dryin})} \quad (6)$$

Where $Y_{dryin}$ is determined by:

$$Y_{dryin} = \frac{M_{h2o,dryin}}{M_{air,dry}} \quad (7)$$

And where $Y_{dryout}$ is determined by:

$$Y_{dryout} = \frac{M_{h2o,dryout}}{M_{air,dry}} \quad (8)$$

And where $Y_{wetin}$ is determined by:

$$Y_{wetin} = \frac{M_{h2o,wetin}}{M_{air,wet}} \quad (9)$$

Where $M_{air,dry}$ is the mass flow rate on a dry basis of the dry side flow through the WVT unit 32 on the lines 24 and 26, $M_{wet,air}$ is the mass flow rate on a dry basis of the cathode exhaust flow through the WVT unit 32 on the lines 30 and 34, $M_{h2o,dryin}$ is the mass flow rate of water entering the WVT unit 32 on the line 24, $M_{h2o,dryout}$ is the mass flow rate of water exiting the WVT unit 32 on the line 26, $M_{h2o,wetin}$ is the mass flow rate of water entering the WVT unit 32 on the line 30 and Y is the mass flow of water per mass flow of dry air ((gm water/sec)/(gm air/sec)), referred to herein as a humidity ratio. While equation (5) applies for cross-flow with no mixing, the heat transfer effectiveness literature gives other equations and tables of values for other flow patterns, for example, counter-flow, co-flow and multiple passes, with and without mixing.

From equations (6), (7) and (9), the amount of water transferred $N_w$ in gm water/sec can be calculated by:

$$N_w = M_{air,dry} \times (Y_{dryout} - Y_{dryin}) \quad (10)$$
$$= \varepsilon \times \min(M_{air,dry}, M_{air,wet}) \times (Y_{wetin} - Y_{dryin})$$
$$= \varepsilon \times \min(M_{air,dry}, M_{air,wet}) \times \left(\frac{M_{h2o,wetin}}{M_{air,wet}} - \frac{M_{h2o,dryin}}{M_{air,dry}}\right)$$

The water transfer value $N_w$ gives an accurate amount of water that is transferred to the cathode inlet air provided on the line 26 by the WVT unit 32, and thus gives an accurate representation of the amount of water and humidity that is available to humidify the cell membranes within the stack 12. The water transfer value $N_w$ can be used by the controller 40 in the operation of the system 10 to control the stack humidity level for various operating conditions and stack current densities and can also be used in the design of the WVT unit 32 for a particular system so that the proper amount of water transfer and resulting cathode inlet humidification is available to the stack 12.

The by-pass line 36 is provided in the wet cathode output line 28 to by-pass the WVT unit 32. In an alternate design, the by-pass line and the by-pass valve can be provided around the WVT unit 32 at the input side where dry air on the line 24 by-passes the WVT unit 32 to control the amount of humidity that is entering the fuel cell stack 12. There is a second alternate design with neither a wet side nor a dry side by-pass. In this situation, the controller 40 can be used to adjust other operating conditions, such as stack temperature, pressure, and/or cathode air flow rate to achieve the correct amount of cathode inlet RH given the water transfer value $N_w$.

The non-dimensional mass transfer effectiveness can be used to characterize the performance of a fuel cell membrane humidification device, such as the WVT unit 32, as well as to determine the optimal design for the WVT unit 32 for a given fuel cell system. The main benefits to this model based effectiveness approach include: (1) convenient and ready visualization of the physical significance of membrane humidification performance because the effectiveness immediately shows the ratio of actual water transfer to maximum possible, (2) allows for the elimination of costly and unreliable RH sensors, (3) allows for a way to evaluate different WVT designs, i.e., cross-flow vs. counter-flow, without physically fabricating and testing the device by using the body of information already developed for heat exchanger designs, (4) by matching the model of the fuel cell membrane humidification device with data which is presented in the effectiveness form, thereby allowing for quick identification of actual performance and easy screening of data values that are physically impossible, and (5) readily calculated in a real time control environment with fast execution, which would not be possible with an equivalent model based on a solution of the governing partial differential equations.

In particular system designs, equation (9) can be simplified. In one such situation, for a wet-side by-pass around the WVT unit 32, it can be assumed that there is no water vapor in the WVT unit 32 dry inlet stream on the line 24, where $M_{h2o,dryin}=0$ and $\min(M_{air,dry},M_{air,wet})=M_{air,wet}$. For this situation, the amount of water transferred $N_w$ is equal to the effectiveness value $\epsilon$ times the amount of water in the wet inlet stream $M_{h20,wet}$ on the line 30 as:

$$N_w = \epsilon \times M_{h20,wetin} \quad (11)$$

In another situation discussed above where the by-pass line by-passes the WVT unit 32 on the cathode inlet side, referred to as a dry side by-pass, it can be assumed that there is no water vapor in the WVT dry inlet stream on the line 24, i.e., $Y_{dryin}=0$. If $\min(M_{air,dry}, M_{air,wet})=M_{air,wet}$, for example, if the by-pass valve is fully closed on the dry side, then the amount of water transferred $N_w$ is the same as in equation (10).

However, if $\min(M_{air,dry},M_{air,wet})=M_{air,dry}$, such as if the by-pass valve on the dry-side bypass is partially open, then:

$$N_w = \varepsilon \times \frac{M_{air,dry}}{M_{air,wet}} \times M_{h2o,wetin} \quad (12)$$

This means that the amount of water transferred $N_w$ is equal to the effectiveness value $\epsilon$ times the amount of water in the wet inlet stream $M_{h20,wetin}$ times the ratio of the dry side flow rate on a dry basis $M_{air,dry}$ to the wet side flow rate on a dry basis $M_{h20,wet}$.

In all of the embodiments of the present invention, test data has demonstrated that the dynamic response of the WVT unit 32 to flow changes is fast, i.e., on the order of seconds. Therefore, a first order lag is used to capture the dynamics of the WVT unit 32 by solving the following ordinary differential equation:

$$\frac{dN_w}{dt} = \frac{1}{\tau_p}(N_{w,ss} - N_w) \quad (13)$$

Where $N_w$ is the time-varying value of the water transport, $N_{w,ss}$ is the instantaneous, steady-state value of $N_w$ as shown in equations (10), (11) and (12), and $\tau_p$ is the characteristic time in seconds.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining the amount of water transferred in a water vapor transfer device, said method comprising:
   determining a capacity ratio that identifies a relationship between wet and dry streams flowing through the water vapor transfer device;
   determining a number of mass transfer units flowing through the water vapor transfer device;
   estimating a mass transfer effectiveness value using the capacity ratio and the number of mass transfer units for the water vapor transfer device; and
   determining the amount of water transferred from the wet stream to the dry stream in the water vapor transfer device using the mass transfer effectiveness value, mass flow rates on a dry basis of the dry stream and the wet stream, and mass flow rates of water in a dry inlet stream and a wet inlet stream.

2. The method according to claim 1 wherein the water vapor transfer device receives a dry input stream, outputs a dry output stream, receives a wet input stream and outputs a wet output stream, where the dry input stream and the dry output stream are the dry stream and the wet input stream and the wet output stream are the wet stream.

3. The method according to claim 1 wherein the capacity ratio is determined using the equation:

$$C^* = \frac{\text{Min}(M_{air,dry}, M_{wet,air})}{\text{Max}(M_{air,dry}, M_{wet,air})}$$

where $M_{air,dry}$ is a mass flow rate on a dry basis flowing through a dry side of the water vapor transfer device and $M_{air,wet}$ is the mass flow rate on a dry basis flowing through a wet side of the water vapor transfer device.

4. The method according to claim 1 wherein determining the number of mass transfer units includes using the equation:

$$NTU = \frac{hA}{\min(M_{air,dry}, M_{air,wet})}$$

where NTU is the number of mass transfer units, h is a mass transfer coefficient, A is a surface area in the water vapor transfer device available to transfer water vapor, $M_{air,dry}$ is a mass flow rate on a dry basis through a dry side of the water vapor transfer device and $M_{wet,air}$ is a mass flow rate on a dry basis through a wet side of the water vapor transfer device.

5. The method according to claim 4 wherein the product hA is determined by the equation:

$$hA = (a_1 \times M_{air,wet}/A + a_2 \times M_{air,dry}/A + b \times RH_{wetin} + c) \times$$
$$\exp\left(-\frac{Ea}{RT_{ave,n}}\right) \times \frac{A}{A_{base}}$$

where $RH_{wetin}$ is the relative humidity of a wet inlet stream to the water vapor transfer device, $T_{ave,n}$ is an average temperature of the wet and dry streams flowing through the water vapor transfer device, Ea is activation energy, A is the membrane area, a, b and c are correlation coefficients and $A_{base}$ is the membrane area of the humidifier design from which the correlation parameters were obtained.

6. The method according to claim 1 wherein estimating the mass transfer effectiveness of the water vapor transfer device includes using the equation:

$$\varepsilon = 1 - \exp\left[\left(\frac{1}{c^*}\right) \times (NTU)^{0.22} \times \{\exp[-C^* \times (NTU)^{0.78}] - 1\}\right]$$

where $\varepsilon$ is the effectiveness value, C* is the capacity ratio and NTU is the number of mass transfer units.

7. The method according to claim 6 wherein the effectiveness value $\varepsilon$ is defined as:

$$\varepsilon = \frac{M_{air,dry} \times (Y_{dryout} - Y_{dryin})}{\min(M_{air,dry}, M_{air,wet}) \times (Y_{wetin} - Y_{dryin})}$$

where $Y_{dryin}$ is determined by $$Y_{dryin} = \frac{M_{h2o,dryin}}{M_{air,dry}},$$

$Y_{dryout}$ is determined by $$Y_{dryout} = \frac{M_{h2o,dryout}}{M_{air,dry}},$$

$Y_{wetin}$ is determined by $$Y_{wetin} = \frac{M_{h2o,wetin}}{M_{air,wet}},$$

$M_{air,dry}$ is the mass flow rate on a dry basis of the dry stream, $M_{air,wet}$ is the mass flow rate on a dry basis of the wet stream, $M_{h2o,dryin}$ is the mass flow rate of water entering the water vapor transfer device on the dry stream, $M_{h2o,dryout}$ is the mass flow rate of water exiting the water vapor transfer device on the dry stream, $M_{h2o,wetin}$ is the mass flow rate of water entering the water vapor transfer device on the wet stream and Y is the mass flow of water per mass flow of dry air ((gm water/sec)/(gm air/sec)), referred to herein as a humidity ratio.

8. The method according to claim 7 wherein determining the amount of water transferred includes using the equation:

$$N_w = M_{air,dry} \times (Y_{dryout} - Y_{dryin})$$
$$= \varepsilon \times \min(M_{air,dry}, M_{air,wet}) \times (Y_{wetin} - Y_{dryin})$$
$$= \varepsilon \times \min(M_{air,dry}, M_{air,wet}) \times \left(\frac{M_{h2o,wetin}}{M_{air,wet}} - \frac{M_{h2o,dryin}}{M_{air,dry}}\right).$$

9. The method according to claim 1 further comprising providing a by-pass line around a wet side of the water vapor transfer device where the amount of water vapor transferred is determined by how much water vapor by-passes the water vapor transfer device.

10. The method according to claim 9 wherein determining the amount of water vapor transferred includes multiplying the mass transfer effectiveness value by the amount of water flowing through a wet side of the water vapor transfer device.

11. The method according to claim 1 further comprising providing a by-pass line around a dry side of the water vapor transfer device.

12. The method according to claim 11 wherein estimating the amount of water transferred includes using the equation:

$$N_w = \varepsilon \times \frac{M_{air,dry}}{M_{air,wet}} \times M_{h2o,wetin}$$

where $N_w$ is the amount of water transferred, $\varepsilon$ is the mass transfer effectiveness value, $M_{air,dry}$ is the mass flow rate on a dry basis of the dry stream through a dry side of the water vapor transfer device, $M_{air,wet}$ is the mass flow rate on a dry basis of the wet stream through a wet side of the water vapor transfer device and $M_{h2o,wetin}$ is the mass flow rate of water entering the water vapor transfer device on a wet side.

13. A method for determining the amount of water transferred by a water vapor transfer device in a fuel cell system, said method comprising:
    determining a capacity ratio that identifies the relationship between wet and dry streams flowing through the water vapor transfer device by dividing a minimum mass flow rate on a dry basis of the dry stream and the wet stream flowing through a dry side and a wet side of the water vapor transfer device by a maximum mass flow rate on a dry basis of the dry stream and the wet stream flowing through the dry side and the wet side of the water vapor transfer device, wherein the dry stream is provided by a dry input stream to the water vapor transfer device and a humidified dry output stream to a fuel cell stack and the wet stream is provided by a wet input stream from a cathode exhaust stream in the fuel cell stack and a wet output stream from the water vapor transfer device;
    determining a number of mass transfer units of the water vapor transfer device by dividing the product of a mass transfer coefficient and a water transfer surface area in the water vapor transfer device by a minimum of the mass flow rate on a dry basis through the dry side of the water vapor transfer device and the wet side of the water vapor transfer device;
    estimating a mass transfer effectiveness value using the capacity ratio and the number of mass transfer units for the water vapor transfer device; and
    determining the amount of water transferred from the wet stream to the dry stream in the water vapor transfer device using the mass transfer effectiveness value, mass flow rates on a dry basis of the dry stream and the wet stream, and the mass flow rates of water of the dry input stream and the wet input stream.

14. The method according to claim 13 wherein estimating the mass transfer effectiveness of the water vapor transfer device includes using the equation:

$$\varepsilon = 1 - \exp\left[\left(\frac{1}{c^*}\right) \times (NTU)^{0.22} \times \{\exp[-C^* \times (NTU)^{0.78}] - 1\}\right]$$

where $\varepsilon$ is the effectiveness value, C* is the capacity ratio and NTU is the number of mass transfer units.

15. The method according to claim 14 wherein the effectiveness value $\epsilon$ is defined as:

$$\varepsilon = \frac{M_{air,dry} \times (Y_{dryout} - Y_{dryin})}{\min(M_{air,dry}, M_{air,wet}) \times (Y_{wetin} - Y_{dryin})}$$

where $Y_{dryin}$ is determined by $$Y_{dryin} = \frac{M_{h2o,dryin}}{M_{air,dry}},$$

$Y_{dryout}$ is determined by $$Y_{dryout} = \frac{M_{h2o,dryout}}{M_{air,dry}},$$

$Y_{wetin}$ is determined by $$Y_{wetin} = \frac{M_{h2o,wetin}}{M_{air,wet}},$$

$M_{air,dry}$ is the mass flow rate on a dry basis of the dry stream, $M_{air,wet}$ is the mass flow rate on a dry basis of the wet stream, $M_{h2o,dryin}$ is the mass flow rate of water entering the water vapor transfer device on the dry stream, $M_{h2o,dryout}$ is the mass flow rate of water exiting the water vapor transfer device on the dry stream, $M_{h2o,wetin}$ is the mass flow rate of water entering the water vapor transfer device on the wet stream and Y is the mass flow of water per mass flow of dry air ((gm water/sec)/(gm air/sec)), referred to herein as a humidity ratio.

16. The method according to claim 15 wherein determining the amount of water transferred includes using the equation:

$$\begin{aligned} N_w &= M_{air,dry} \times (Y_{dryout} - Y_{dryin}) \\ &= \varepsilon \times \min(M_{air,dry}, M_{air,wet}) \times (Y_{wetin} - Y_{dryin}) \\ &= \varepsilon \times \min(M_{air,dry}, M_{air,wet}) \times \left( \frac{M_{h2o,wetin}}{M_{air,wet}} - \frac{M_{h2o,dryin}}{M_{air,dry}} \right). \end{aligned}$$

* * * * *